Sept. 15, 1953

C. E. SCHOU 2,651,950

FOURTEEN-SPEED PLANETARY TRANSMISSION

Filed Oct. 24, 1949

Inventor
Carl Einar Schou,

By
Ralph J Barrett
ATTORNEY

Sept. 15, 1953            C. E. SCHOU            2,651,950
FOURTEEN-SPEED PLANETARY TRANSMISSION
Filed Oct. 24, 1949            7 Sheets-Sheet 2

Inventor
Carl Einar Schou,
Ralph J. Bassett
Attorney

Sept. 15, 1953 C. E. SCHOU 2,651,950
FOURTEEN-SPEED PLANETARY TRANSMISSION
Filed Oct. 24, 1949 7 Sheets-Sheet 4

Carl Einar Schou,
INVENTOR

BY Ralph J. Bassett
ATTORNEY

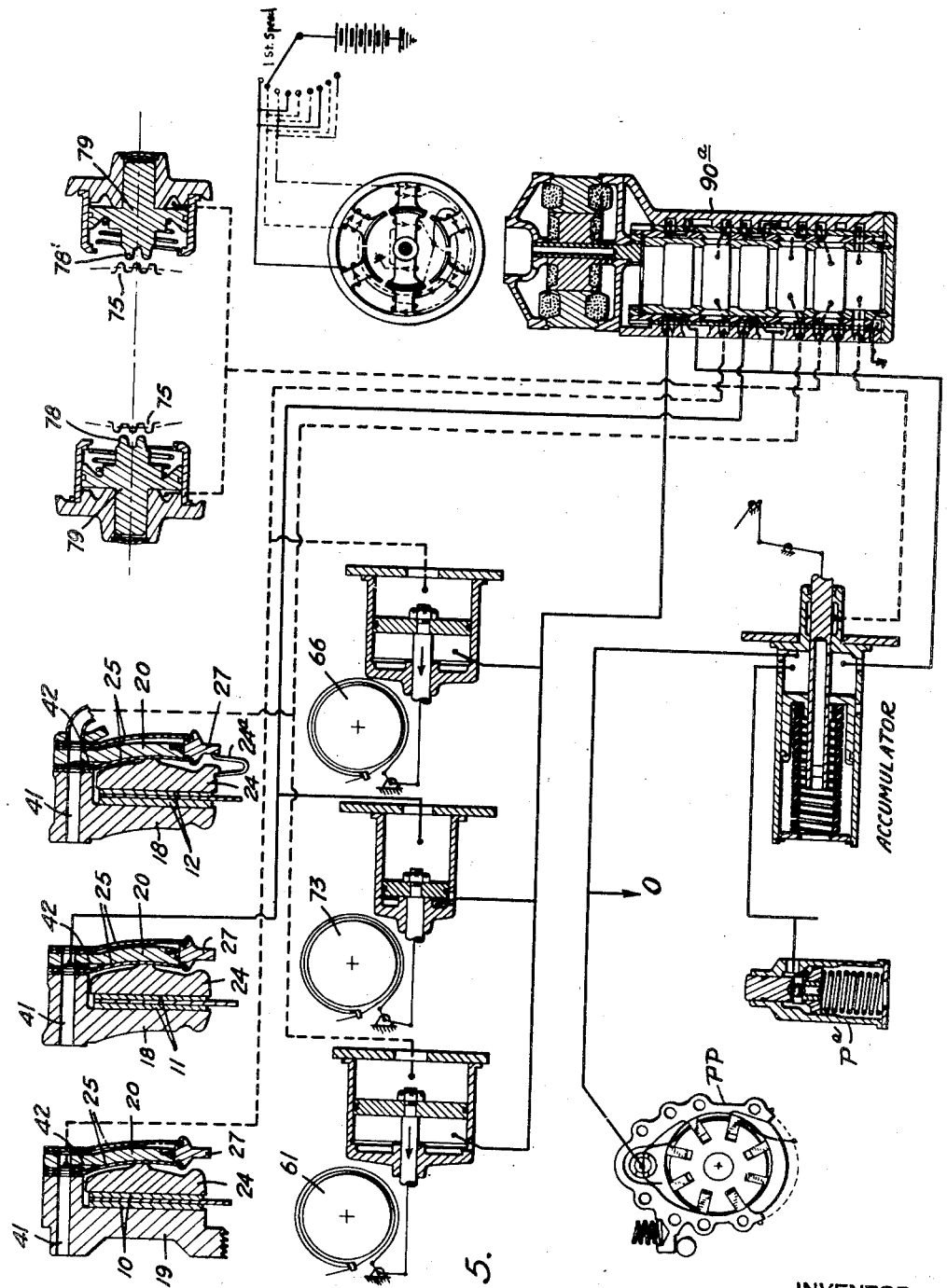

Sept. 15, 1953  C. E. SCHOU  2,651,950
FOURTEEN-SPEED PLANETARY TRANSMISSION
Filed Oct. 24, 1949  7 Sheets-Sheet 6

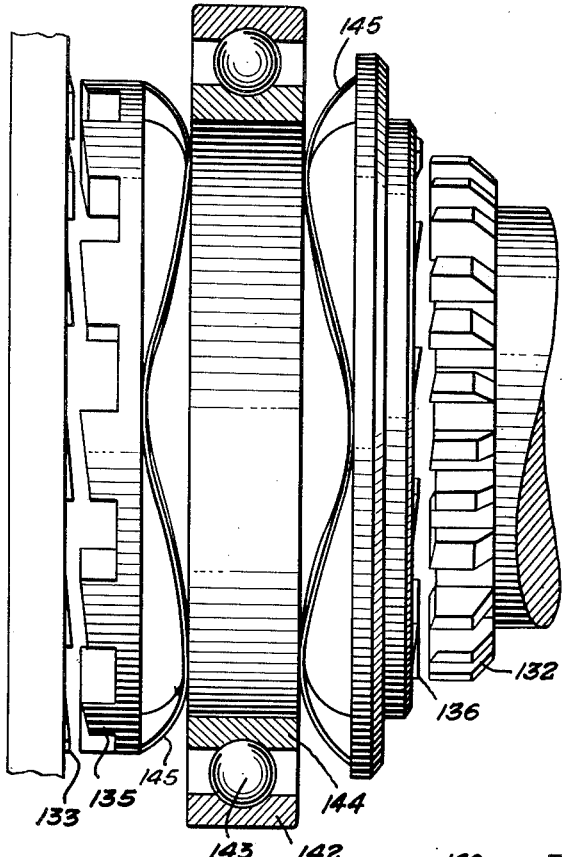

Fig. 6.

| Gear Ratios & Clutch Brake Functions | | | | | | | |
|---|---|---|---|---|---|---|---|
| SPEED | RATIO | CLUTCHES | | | BRAKES | | | REV. SPRAGS |
| | | #1 | #2 | #3 | #1 | #2 | #3 | |
| REV | 4.82-1 | ON | OFF | OFF | OFF | OFF | OFF | IN |
| NEU | | OFF | OFF | OFF | OFF | OFF | OFF | OUT |
| 1st | 4.50-1 | OFF | ON | OFF | ON | OFF | ON | OUT |
| 2nd | 3.00-1 | ON | OFF | OFF | ON | ON | OFF | OUT |
| 3rd | 2.25-1 | OFF | OFF | ON | OFF | ON | ON | OUT |
| 4th | 1.80-1 | ON | ON | OFF | ON | OFF | OFF | OUT |
| 5th | 1.50-1 | OFF | ON | ON | OFF | OFF | ON | OUT |
| 6th | 1.25-1 | ON | OFF | ON | OFF | ON | OFF | OUT |
| 7th | 1.00-1 | ON | ON | ON | OFF | OFF | OFF | OUT |

Fig. 11.

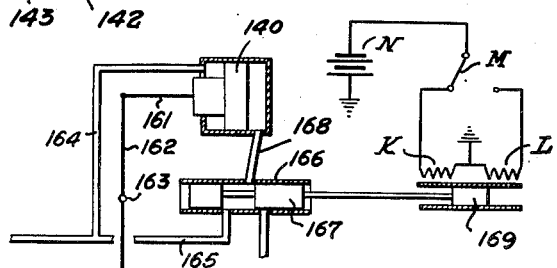

Fig. 7.

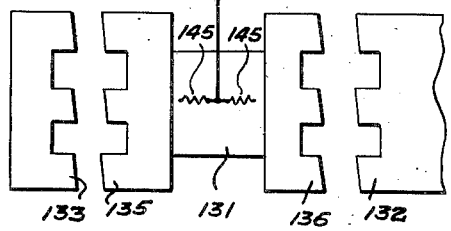

Inventor
Carl Einar Schou,
By
Ralph J. Barnett
ATTORNEY

Sept. 15, 1953    C. E. SCHOU    2,651,950
FOURTEEN-SPEED PLANETARY TRANSMISSION
Filed Oct. 24, 1949    7 Sheets-Sheet 7
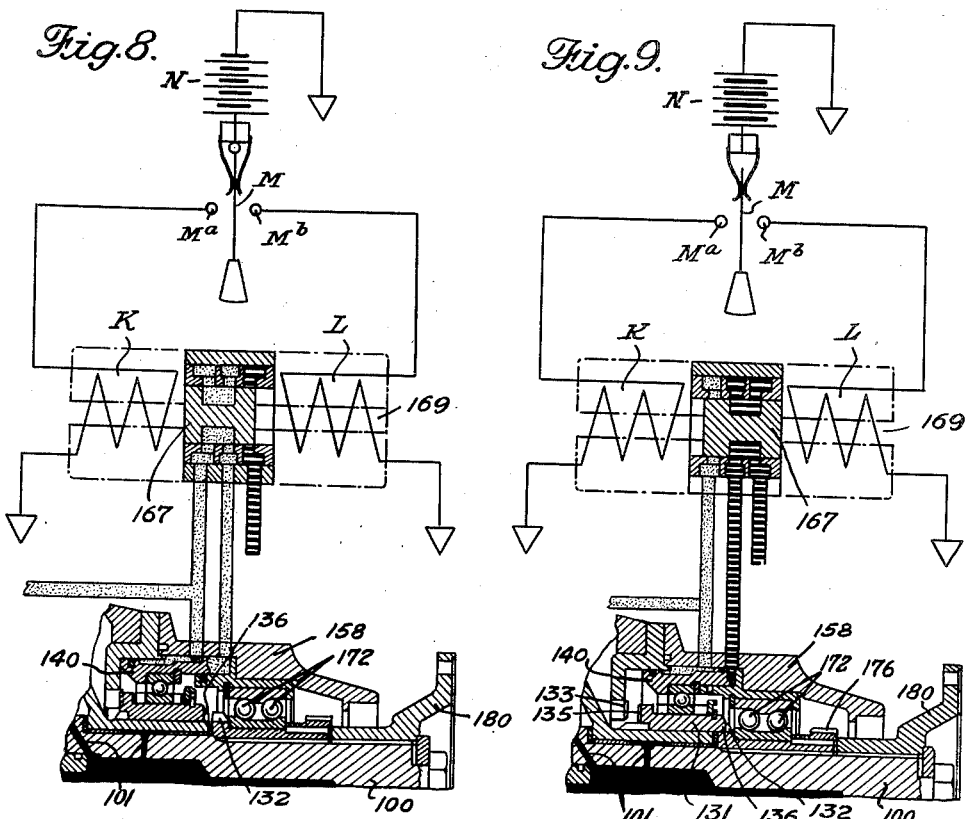
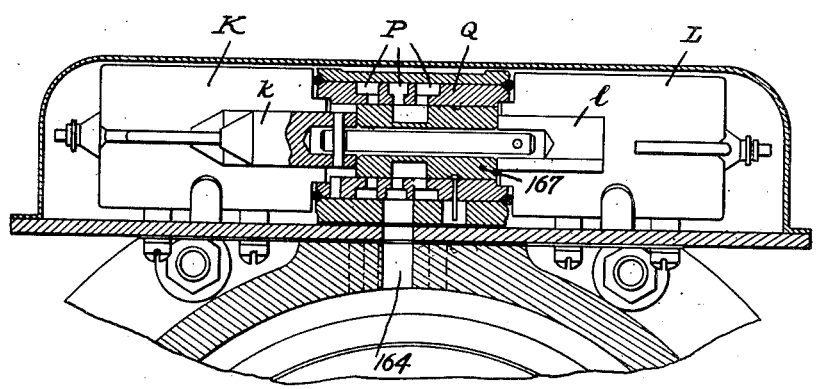
Fig. 10.
INVENTOR.
Carl Einar Schou,
BY Ralph L Bassett

UNITED STATES PATENT OFFICE 2,651,950

FOURTEEN-SPEED PLANETARY TRANSMISSION

Carl Einar Schou, Seattle, Wash., assignor to Pacific Car and Foundry Company, Renton, Wash.

Application October 24, 1949, Serial No. 123,267

8 Claims. (Cl. 74—759)

This invention relates to improvements in a pre-selected planetary transmission controlled from a multiple clutch assembly.

One of the objects of the invention is to provide a speed reducing unit for supplying each of the speeds of a pre-selected planetary transmission to a pre-determined ratio.

A further object of the invention is to provide in a pre-selected planetary transmission, controlled from a multiple clutch assembly, with a speed varying unit for changing each of the speeds of the transmission to a pre-determined ratio and in which the speed varying unit is capable of cooperating at any and all speeds, and without reduction of the speed of the input shaft.

Another feature of this invention is to provide a speed reducing unit for changing the speeds of a main transmission in which a construction and arrangement of parts is provided wherein association between the speed reducing unit and the main planetary transmission can be accomplished at all speeds without synchronization between the main transmission and the auxiliary speed reducing transmission.

A still further object of the invention resides in the use of the main or unit transmission for synchronizing the drive between the same and the auxiliary speed reducing transmission without affecting the speed of the motor.

A further object accomplished by the present invention is the provision of synchronizing means between a main unit transmission and an auxiliary transmission in which the overrunning of the vehicle at the time the power is disconnected is utilized in synchronizing the transmission shafts.

More specifically, this invention comprehends a plurality of transmission assemblies, one of which is capable of pre-selection independent of motor speed, and the other of which is capable of cooperation with the first transmission without variation of the motor speed, and by control of the first transmission through shifting to the neutral position, the driven shaft is synchronized with the main transmission shaft through the use of a planetary unit and the reduction of the speed of the main transmission shaft for synchronization is multiplied in accordance with the planetary structure.

Other objects of this invention will more clearly hereinafter appear by reference to the accompanying drawings and specification, wherein like characters of reference designate corresponding parts throughout the several views, in which:

Fig. 5 is a diagrammatic view of the operating system for the unit transmission;

Fig. 6 is an enlarged vertical section through a portion of the clutch of the speed reducing unit;

Fig. 7 is a diagrammatic view of the speed reducing unit clutch actuating means;

Fig. 8 is a view illustrating one position of the clutch for the speed reducing unit and the operating mechanism therefor;

Fig. 9 is a further view showing an alternate position of the clutch of the speed reducing unit and operating means therefor;

Fig. 10 is a longitudinal section showing the valve control for the clutch of the speed reducing unit; and Fig. 11 is a schedule of operation.

Figure 1:
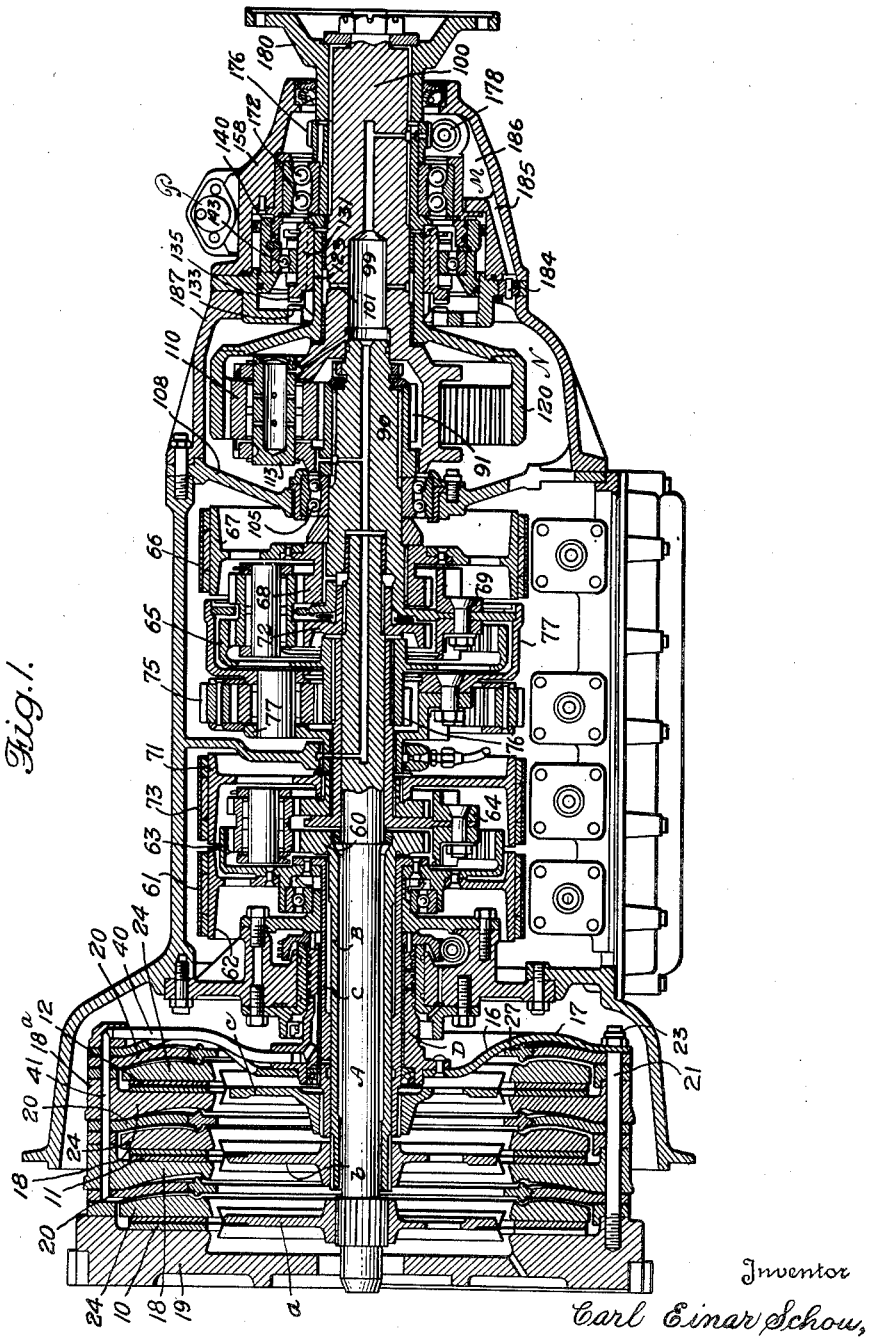
Fig. 1 is a longitudinal section through a unit transmission and multiple clutch assembly with the speed reducing unit associated therewith.

Referring to Fig. 1, the multiple clutch assembly and the main or unit transmission are of the type shown in my co-pending applications Ser. No. 2,293, filed January 14, 1948 and Ser. No. 82,195, filed March 18, 1949.

Figure 2:
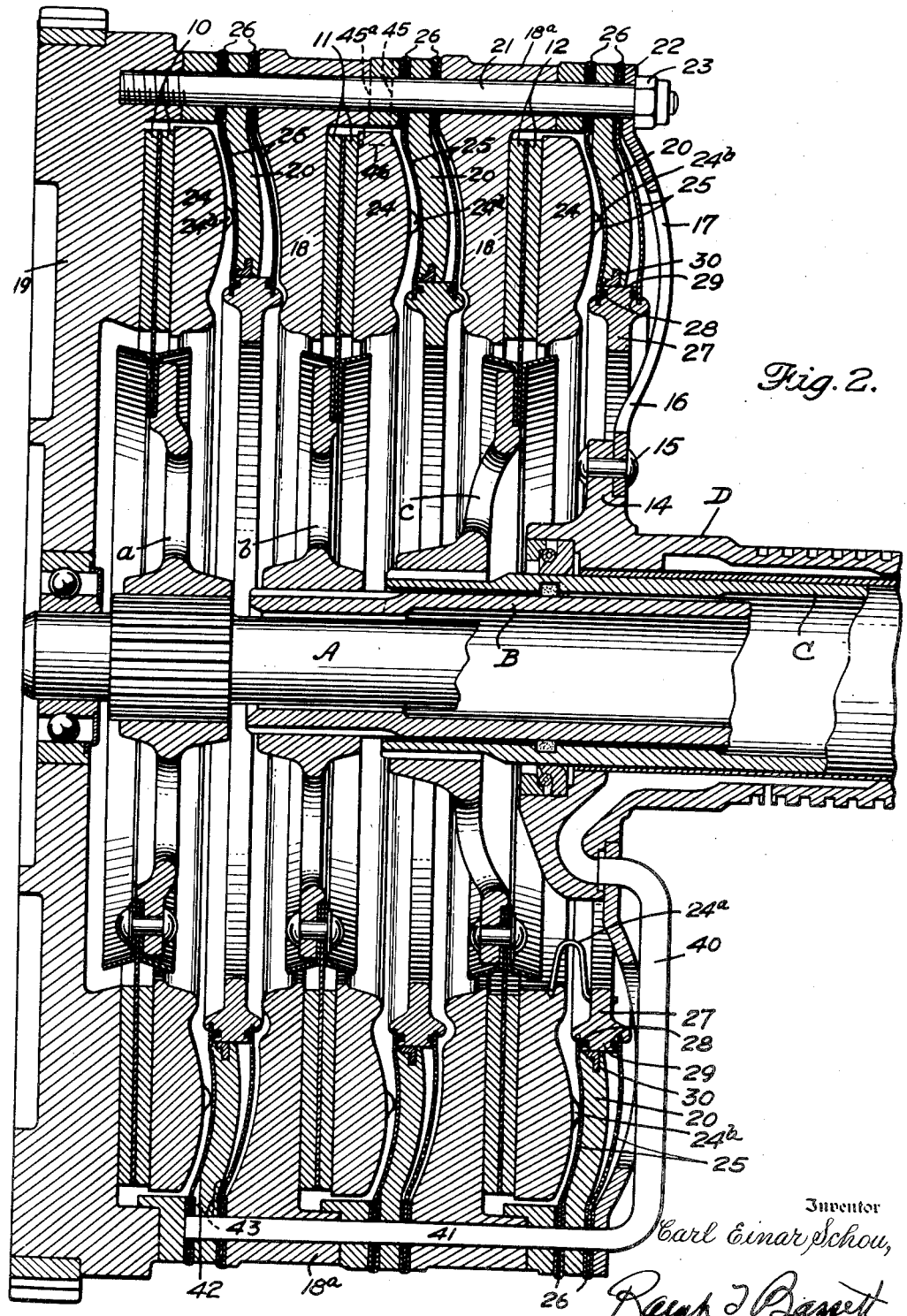
Fig. 2 is a vertical section through the clutch structure.

Referring now to the clutch structure, there is illustrated in Fig. 2 three driven shafts indicated by reference characters A, B, and C, these shafts being concentric, with the central shaft A projecting beyond the end of the intermediate hollow shaft B and the end of this intermediate hollow shaft projecting outwardly from the end of the hollow outer shaft C, the exposed portions of each shaft providing a support for the spiders $a$, $b$, and $c$ which carry the driven discs 10, 11 and 12, respectively. The spiders $a$, $b$, and $c$ are suitably splined to the ends of the shafts A, B, and C as is conventional in such instances. Also the discs 10, 11 and 12 are generally of conventional form.

The shafts A, B, and C are arranged in and confined by the tubular housing D, this housing D being provided with annular flange 14 to which is secured as by rivets 15, the slotted concave housing plate 16. The slots in the housing may be of any form or design to permit essential cooling by air flow and are indicated by the reference character 17. The housing embodies a cylinder structure enclosing the clutch units, this cylinder structure being fabricated to embody supporting means for the outer backing plates 18—18 for the two inner clutch assemblies, the outer backing plate for the clutch 10 being provided by the flywheel as indicated at 19. Arranged alternately of the backing plates 18 are the inner fixed annular concave partitions 20 which are located within each of the three fluid chambers defined by the diaphragms. The backing plates 18 and 19 and the fixed concave inner backing plates or partitions 20 are positioned and secured by elongated bolts 21 suitably spaced about the marginal edge of the casing assembly, the bolts extending into and supporting the casing from the flywheel 19. It will be noted that each of the backing plates 18 have lateral flange portions 18ª tending to elongate the housing. The housing wall 16 has its marginal edge 22 flattened to receive the head 23 of the elongated bolts 21 so that the parts can be clamped together. Also clamped between the alternate backing plates and partitions are the metallic concave diaphragms 25, these plates having their outer marginal edges sealed by rubber gaskets 26 to prevent leakage at their outer ends. The inner ends of the diaphragms 25 are fixed in annular grooves formed at the outer faces of the ring or piston elements 27, seals or packing rings 28 being provided between each of the plates and the abutting wall of the annular projection 29 of the pistons to effect a seal at this end of the plates and to provide between each pair of diaphragms 25 a sealed chamber which is partitioned by the annular concave backing element 20. The diaphragms 25 will preferably be of the type of the Belleville washer and may be made from suitable steel alloy or from copper or any other desired material capable of providing the requisite factors including inherent relatively stiff resiliency which will result in the diaphragms normally retaining or assuming a fixed predetermined position while permitting these diaphragms to shift together under pressure from a suitable fluid solution as will be hereinafter more fully described.

The inner annular edge of the backing plates 20 are each provided with a suitable seal 30 which engages the adjacent outer annular face of the extension 29 of annular piston 27 to provide a suitable sealing relation therebetween. Each of the diaphragms 25 of each of the fluid chamber units of each clutch actuating assembly is so spaced as to provide at each side of the inner backing partition 20 chambers of substantially the same capacity. Spring clips 24ª are interposed at predetermined positions between the active clutch pressure plates 24 and the inner ring pistons 27 of the fluid chambers to assist in maintaining these clutch plates 24 in position and to function as anti-rattling devices. The active pressure plates 24 are each slidably mounted on the outer casing by a number of spaced pins, one of which is indicated by reference character 45, see Fig. 1. These pins are pressed into the outer casing and fit into transverse slots in the outer peripheral edge of each of the pressure plates 24. The pressure plates 24 consequently can move longitudinally as shown in Fig. 1 of the drawings. The grooves 46 which are milled in the outer peripheral edge of the pressure plates cooperate with the square heads 45ª of the pins, these square heads of the pins riding in the milled groove and keeping the pressure plates aligned and permitting their longitudinal movement. The limitation of movement of each of the pressure plates is determined by the diaphragms on one side and the clutch plate on the other. Normally the clearance between the clutch plates 10, 11, and 12, and pressure plates 24 is preferably in the order of $\frac{1}{32}''$. The movement of the diaphragm to cause clutch engagement of the plate need not be more than $\frac{1}{32}''$.

Inasmuch as each of the chambers provided at each side of the backing plate 20 is substantially of the same capacity and with the same pressure areas and is adapted to contain fluid from the same source and normally at the same pressure, it will be apparent that at high speed rotation the clutch will remain neutral. This is due to the fact that the centrifugal forces, acting on the fluid in the chambers, creates energy which will act in all directions inside of the chambers, and these centrifugal forces are in equilibrium under all conditions and regardless of speed. The static condition created by centrifugal force is subject to unbalance by a variation of the pressure in the high pressure side of the clutch assembly, this unbalance creating the operating pressure provided in the structure for movement of the active pressure plates of the clutch assemblies. It will be noted that the size of the low pressure chamber will provide sufficient clearance to permit extra movement compensating for clutch wear.

Figure 3:
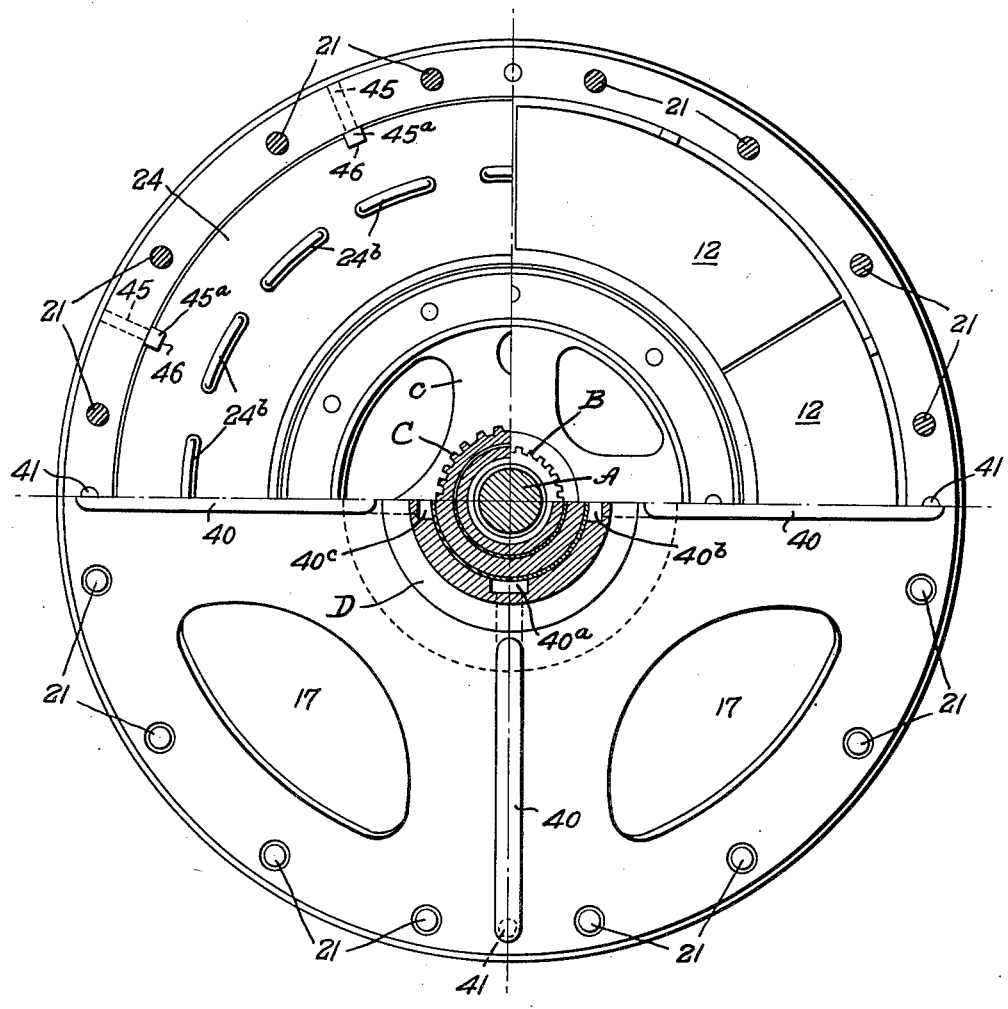
Fig. 3 is an end view partly in section of the clutch assembly.

The operating fluid is provided in the high pressure side of each chamber by suitable conduits 40, three in number, which feed the high pressure side of the clutches and an additional feed pipe which normally supplies low pressure to the low pressure side of each of the fluid chambers to maintain a constant volume in this low side. These conduits 40 extend into the wall of the annular chamber or hub D to deliver the fluid to the individual clutch assemblies through ports which are drilled into the clutch casing structure as at 41. In Fig. 3 which is a transverse section, the conduits 40 are illustrated with the hub ports 40ª, 40ᵇ, and 40ᶜ shown in section for communicating with clutches 1, 2 and 3. The discharge from hub port 40ª discharging through the connection 41 in the clutch casing and conducting fluid into the outer clutch 1 and between the outer clutch plate and the backing plate. Each fluid chamber as comprehended by the fixed backing plates 20 and the diaphragms 25 are provided with a high pressure inlet 42 which will be supplied with a fluid under pressure, for instance, approximating 130 lbs. The opposite chamber in each of the fluid motors is provided with suitable communications indicated in dotted line at 43 to normally supply fluid at low pressure, say 60 lbs., to the low pressure side of the cylinder. The low pressure side of each of the cylinders is normally in communication with the same source of supply and same ducts so that the low pressure side of each chamber remains with a normally constant pressure substantially below the pressure which may be applied to the cylinder at its high pressure sides through ducts 42.

As previously stated the diaphragms 25 are so constructed as to provide the necessary tension to normally maintain the piston or ring 27 at approximately the position illustrated in Fig. 1, in which position the clutches are disengaged. This normal position of the diaphragms which is maintained by the inherent tension of the diaphragm structures provides in cooperation with medial backing plates 20, the high and low pressure chambers. The pressure chambers may contain low pressure fluid at all times so that the operation of the various clutches is accomplished by overcoming the pressure in the low pressure chamber, plus the inherent spring reaction of the plates due to their structure. The diaphragms for the low pressure chamber are normally free of contact of the pressure plates 20 and therefore the pressure in the low pressure chamber is not sufficient to distort the low pressure diaphragm but only sufficient to maintain both the diaphragms in their normal unsprung position. The pressure on the diaphragms is not determined by the volume between the diaphragms and the backing plate but only by the area in the longitudinal projection. Thus it will be seen that while both the low and high pressure chambers may be capable of substantially the same volume, one may contain less volume, but this is not important because the actual working pressures as defined by the pressure areas are in the direction of the longitudinal axis or horizontally of the structure. In order that the effective pressure in both the high and low pressure chambers may be accordingly provided, the arrangement is such that the pressure plate faces in both the high and low pressure chambers never snugly engage the diaphragms so that portion of the diaphragm area is never blocked against pressure action. This is obviously provided for by the structure of the parts and the selection of material from which the diaphragms are made, this material, as heretofore stated, being inherently sufficiently resilient that the diaphragms maintain their normal predetermined concave shape at all times including the time of their shifting. The shape of the diaphragms is fairly critical and may affect the successful operation of the device and of the pressure which acts upon the clutch and thus this feature of the development is of prime importance. In addition, inasmuch as the operation of the diaphragms corresponds substantially to the movement of the piston in that the direction of the force is constant, the nature of the material used, as well as the shape of the diaphragm, and its thickness are all features of paramount importance.

An annular bead 24$^b$ is arranged medially of each pressure plate 24 at its outer face and against which the adjacent diaphragm or pressure plate operates. When high pressure fluid is forced in between the adjacent diaphragm and the enclosed partition or backing plate 20, the inner ring 27 which seals the inner peripheral edges of the pair of diaphragms will move the diaphragms toward the adjacent active plate 24, which in turn will be forced against one of the driven members 10, 11, or 12 in accordance with the clutch assembly which is in operation.

The diaphragms, which as heretofore stated, are of the Belleville washer type are normally concave and maintain their concave shape even under pressure from the fluid and during the course of operation. In other words, the concave pair of diaphragms 25 of each fluid chamber shift as a unit and in concave form carrying with them the inner ring structure 27 which is suitably sealed by a gasket 30 with the inner periphery of the partition 20. The rings 27 of each fluid motor will move longitudinally when high pressure is applied and will move with the diaphragms toward the medial adjacent bead 24$^b$ of the active plates 24. Due to the structure and the assembly of the clutch the force acts on the pressure plate always in a horizontal direction or in the direction of the axis of the shaft, thus preventing canting or unbalancing of the pressure plates.

In order to balance this condition and prevent any self-injury on the clutch system, there is provided a low pressure chamber at the opposite side of the pressure plates which normally has substantially the same capacity as the high pressure chamber. If both the high and low pressure chambers are filled with oil, and it is spun around, then the centrifugal forces within the system are in equilibrium. This construction has a tremendous effect on the success of the operation of the clutch. The fluid pressure itself, as applied to the active clutch plate, unbalances the static condition and represents the operating pressure. In order to apply pressure on the clutch you will have to apply pressure through the control lines 40 which lead into the high pressure chambers. A separate oil line connects the high pressure chamber of each individual clutch. There is a normal low pressure line to the low pressure side of each clutch which together with the leakage about the inner ring establishes low pressure chambers in each clutch at all times including that period when high pressure is applied to the high pressure chamber to operate the associated clutch. The operation of each clutch must therefore be accomplished by overcoming the pressure in the low pressure chamber. The high and low pressure chambers have the same areas in the transverse sections. The longitudinal acting pressure caused by centrifugal force acting upon fluid is always in equilibrium regardless of revolving speed. The effective operating pressure is equal to pressure in the high pressure chamber minus pressure in the low pressure chamber. If all the fluid chambers of each of the clutches were full of fluid at all times, these clutch plates would be balanced at each side of the inner pressure plate or partition 20. The diaphragm has a certain tension which normally keeps the ring moved in the location that is shown in the sketch with the low and high pressure chambers of substantially equal capacity. It will be noted that the shape of each of the diaphragms is such that these diaphragms are maintained in such a position that the feed lines to the low pressure chambers are normally open to receive fluid.

The diaphragm for the low pressure chamber, it will be noted, is normally free of contact of the pressure plate and therefore the pressure at any one point in the low pressure chamber is not sufficient to distort the low pressure diaphragm but only sufficient to maintain both of the diaphragms in their normal unsprung position. The pressures on the diaphragms are not determined by the volume between the diaphragm and the backing plate but only by the area in the longitudinal projection. Both of the pressure chambers (low and high pressure) are substantially the same volume, but this is not important because the actual working pressures are in the direction of the longitudinal axis of the structure or horizontally of the structure.

The gear associated with the present clutch assembly involves three planetary gear trains, with the various speed ratios engaged hydraulically by the three disc clutches heretofore described, and with the association of three friction drums or brakes connected into and with the planetary gear trains. The transmission is of the general type of my prior application Ser. No. 2,293, filed January 14, 1948, and a single shift lever or gear selector is employed and may be located at any desired place, such as on the steering column or wherever is convenient to the driver. The control will normally include nine positions, one for each of the seven forward speeds and a control for neutral and reverse. As heretofore described, the three friction clutches which are mounted on the flywheel can be independently operated and are actuated by fluid pressure provided by a pump PP, preferably located in the transmission sump. The general operation of the three planetary trains and the associated clutch and brakes to procure the flow of torque at the various speed ratios will be substantially as follows:

The first speed is obtained by engaging the second or intermediate clutch which transmits the torque to the sun gear 60 of the first planetary train. The brake band 61 is hydraulically applied to the drum 62 which holds the ring gear 63 stationary. The planet carrier 64, which is the driven member of this first gear train, is integral with the driving ring gear 65 of the third planetary gear train. In this first speed operation the brake 66 is applied to the brake drum 67 to lock the latter and to hold the sun gear 68 stationary. The planet carrier 69 of the third planetary gear train is the driven member of the third planetary unit and is integral with the output shaft 70. The reduction of the first gear train is 3-1 and in the third gear train it is 1.5-1 so that the total reduction is 4.5-1.

To secure the second speed, the first clutch is engaged directly to the flywheel and the torque is transmitted through the main shaft A to the sun gear 72 of the third planetary unit. The ring gear 65 of the third planetary unit which is splined to the carrier 64 of the first planetary unit is held stationary by the application of the friction band or brakes 61 and 73 to lock the drums 62 and 71 of the first and second assemblies and through the locking of these drums lock the ring gear 63 and the sun gear 60. This combination produces the ratio 3.00-1.

In producing the third speed the third or inner clutch is engaged to the flywheel by actuation of the associated fluid motor and rotates the ring gear 63 of the first planetary gear train. The sun gear 60 of the first gear train, which is splined to the clutch B, rotates the carrier 64 of the first gear train and the ring gear 65 of the third planetary unit, the rotation being ⅔ the speed of the crankshaft. In the third gear train the sun gear 68 is held stationary by locking the drum 67 by applying the brake 66 through fluid pressure. The reduction in this case is equal in the first and third gear trains so that the total reduction is 2.25-1.

In the fourth speed, the first and second clutches are engaged to the flywheel and part of the torque is transmitted from the second clutch to the sun gear 60 in the first planetary train. The first drum 62 is locked by the application of the brake and the carrier 64 is then rotating ⅓ of the speed of the crankshaft. The carrier 64 and the output shaft driven thereby is splined to the ring gear 65 of the third gear train, and thus the torque is here combined with the remainder of the torque which is transmitted from the first clutch to the sun gear 72 of the third planetary train. This produces a reduction of approximately 1.80-1.

To obtain the fifth speed, the second and third clutches are engaged and these in turn revolve the first planetary gear train and also the ring gear 65 of the third gear train at engine speed. The third drum 67 is held stationary by application of the brake 66 and the carrier on the output shaft 70 revolves with a reduction or speed equal to 1.50-1.

In the sixth speed the clutches 1 and 3 are engaged to the flywheel and part of the torque is transmitted to the ring gear 63 of the first gear train. The intermediate or second drum 71 is held stationary by the application of the brake 73 and the ring gear 63, splined to the carrier of the first gear train, revolves at the speed of ⅔ the engine R. P. M. The remainder of the torque is transmitted from the first clutch to the sun gear 72 of the third gear train assembly and is in the third gear train combined with the torque transmitted to the ring gear of the same unit. The overall reduction is 1.286–1.

To obtain the seventh speed all three of the clutches are engaged and torque is transmitted to the sun gear 60 and the ring gear 63 of the first planetary unit. Consequently the ring gear being splined to the carrier 64 is revolving at engine speed. The remainder of the torque is transmitted directly from the No. 1 clutch to the sun gear 72 of the third gear train. As a result, all members of the planetary system are thus revolving at the same speed and the ratio is 1.00–1.

In reversing, the first clutch is engaged to the flywheel and ring gear 75 is held stationary. The torque is transmitted to sun gear 72 of the third planetary gear train. Here torque is divided, part of it being applied to planet carrier 69, the remainder of the ring gear 65 which is connected to sun pinion 76 in the second planetary assembly. That part of the torque which is applied to planet carrier 69 is combined again with the remainder of torque which passes from ring gear 65 through reversing gear sun pinion 76 to planet carrier 77 and thence to output shaft 70. In this case all three members of the planetary gear rotate, the sun gear 72 being the driver while ring gear 65 and planet carrier 77 are the driven members. The torque applied to the planet carrier 69 is transmitted directly to the output shaft, while that transmitted to the ring gear 65 is carried to the sun gear 76 of the reversing unit, and after being modified on that unit is transmitted through the reverse unit planet carrier 77 to output shaft 70 to which the planet carrier is made integral. In reverse, two sprags 78—78' are hydraulically engaged by means of fluid operated pistons 79 with the external teeth of ring gear 75. The reduction in reverse is 4.82–1.

*Gear ratios and clutch brake functions*

| Speed | Ratio | Clutches | | | Brakes | | | Rev. Sprags |
|---|---|---|---|---|---|---|---|---|
| | | #1 | #2 | #3 | #1 | #2 | #3 | |
| Reverse | 4.82–1 | On | Off | Off | Off | Off | Off | In. |
| Neutral | | Off | Off | Off | Off | Off | Off | Out. |
| 1st | 4.50–1 | Off | On | Off | On | Off | On | Out. |
| 2d | 3.00–1 | On | Off | Off | On | On | Off | Out. |
| 3d | 2.25–1 | Off | Off | On | Off | On | On | Out. |
| 4th | 1.80–1 | On | On | Off | On | Off | Off | Out. |
| 5th | 1.50–1 | Off | On | On | Off | Off | On | Out. |
| 6th | 1.23–1 | On | Off | On | Off | On | Off | Out. |
| 7th | 1.00–1 | On | On | On | Off | Off | Off | Out. |

Figure 4:
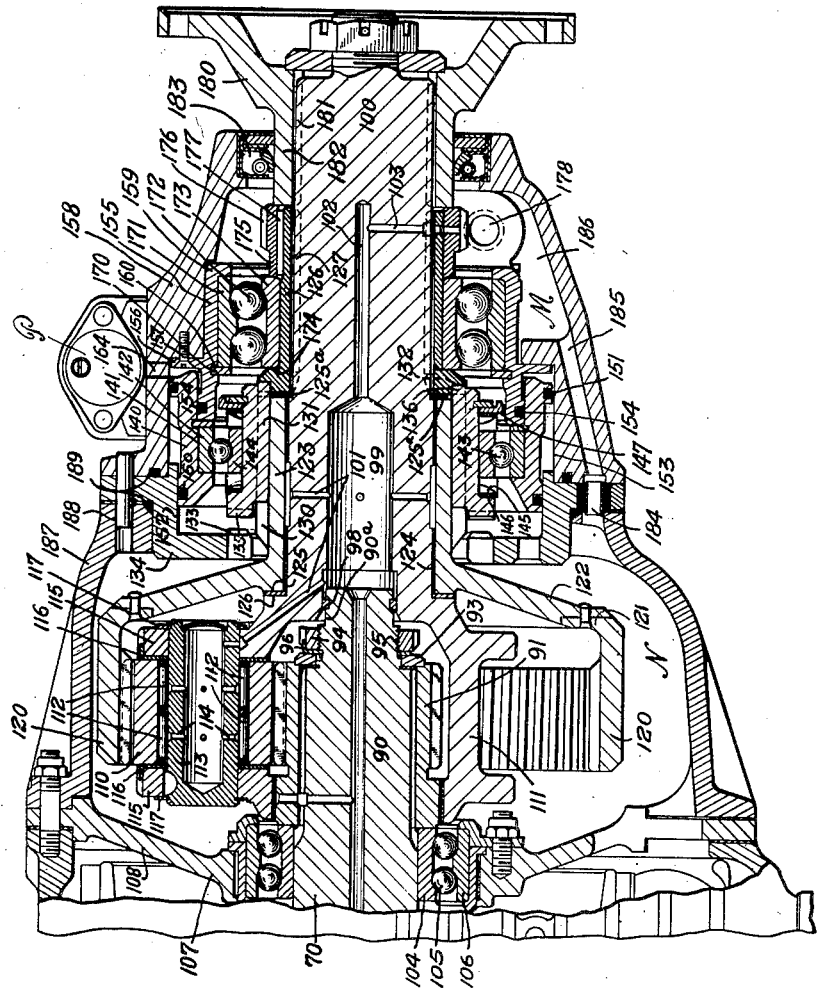
Fig. 4 is an enlarged longitudinal section of the speed reducing unit and clutch therefor.

As previously stated, one of the objects of this invention is to combine with a pre-selected planetary transmission, controlled from a multiple clutch unit, a speed modifying unit for multiplying each of the speeds of the main transmission to a predetermined ratio, in the present assembly 4 to 1, with the main transmission capable of cooperation at any speed and without reduction of motor speed by lowering the main transmission speed to synchronize with the cooperating part of the auxiliary speed reducing transmission. In the further description of this development, the main transmission, i. e. the preselected planetary transmission controlled by the multiple unit clutch and heretofore described, will be referred to as a unit transmission, while the compounding unit, i. e. the speed reducing unit of Fig. 4 and hereinafter described, will be referred to as the speed reducing transmission.

To accomplish the foregoing the following structure is provided. The reduced longitudinally ribbed portion 90 of the output shaft 70, of the main transmission, has fixed thereon the sun pinion 91, this pinion being retained against outward longitudinal displacement on the reduced end of the shaft 70 by means of the annular stop ring 93 and the lock nut 94 which is threaded on the shaft extremity as at 95 and fixed by the lock washer 96. The reduced extremity 90ᵃ of the end portion 90 of shaft 70 is of true cylindrical form and is provided with a recess in which is seated the packing 98 which seals the end of the chamber 99 formed in the driven stub shaft 100 and in which the cylindrical extremity 90ᵃ is positioned. The stub shaft 100 is recessed at its inner end portion and axially thereof to provide the chamber 99 which has radial ports 101 and an axaial reduced bore 102 communicating with radial ports 103. The sun pinion 91 is prevented from having inner longitudinal movement by virtue of the inner race 104 against which it abuts, the inner race 104 cooperating with the balls 105 and the outer race 106, and which form a ball bearing assembly for the outer end portion of shaft 70. This ball bearing assembly is located within the hub 107 of the partition 108, which forms a part of the casing and separates the unit transmission from the auxiliary speed reducing transmission. The planetary pinions 110, which will normally be three in number, are supported in a cage formed by a hub-like extension 111 of the stub shaft 100, these planetary pinions being freely rotatable on bearings 112 arranged about the hollow tubular supports 113 which are provided with suitable radial ports 114 for feeding lubricant to the structure. On the tubular supports 113 are the end stop rings 115 having thrust washers 116 and outer stop rings 117 as is conventional in structures of this type. Due to this construction, when the cage 111 rotates carrying with it the pinions 110, the stub shaft 100 will rotate therewith.

Completing the planetary unit is the ring gear 120 and obviously the planet pinions 110 rotate between the sun gear 91 and the ring gear 120. The ring gear 120 has inwardly projecting flange 121 which faces against the marginal portion of the flange 122 of the hub structure 123, this hub structure being mounted on the stub shaft 100 with suitable bearings 124 therebetween. Lubricant is fed from the chamber 99 through radial ports 101 to this hub structure and the same is retained against longitudinal displacement at each end by the stop rings 125 and 125ᵃ, the stop ring 125 abutting the shoulder 126 of the hub 111 which is a part of the stub shaft 100. This prevents the hub 123 of the ring gear from having longitudinal movement inward. Longitudinal movement outward obviously is prevented by the stop ring 125ᵃ which abuts against the inner end portion of the clutch element 126 which is splined on the end portion of the stub shaft 100 by the splines 127. Splines 130 are provided on the hub 123 and a longitudinal shiftable clutch and brake element 131 is mounted on the splines 130 for movement into engagement with the teeth 132 of the fixed clutch element 126 and the teeth 133 formed in the outer face of the inner marginal portion of the partition element 134. Thus the clutch and brake element 131 with the teeth 135 at its inner end and teeth 136 at its outer end is shiftable to the two engaging positions or to an intermediate position, this shifting being accomplished by a fluid piston indicated generally at 140. The fluid piston 140 is generally of tubular form and is provided with an annular inner recess 141 for receiving the outer race 142 of a bearing assembly, which includes the balls 143 and the inner race 144. At each side of the inner race 144 which is positioned medially about the sliding clutch and brake element 131 are the centralizing springs 145 shown more clearly in Fig. 6. These springs are interposed between the shoulder 146 and the stop ring 147 and the side walls of the inner race 144 of the bearing assembly to normally exert a pressure which retains the piston 140 and the clutch and brake element 131 neutral. The annular piston 140 is provided at its outer end portions with the O-ring seals 150 and 151, the seal 150 contacting the annular face 152 of the partition element 134 which is machined to produce an annular face for association with the annular piston 149. The O-ring seal 151 is associated with the machined cylinder wall 153, this cylinder wall 153 being of greater diameter than the cylinder wall 152 which necessitates the offsetting of the piston structure at the outer end for association therewith. By this construction the movement of the piston 140 in the cylinder heretofore defined, and including the cylinder walls 152 and 153, will result in the shifting of the bearing assembly 142—143—144 and the movement of the sliding clutch and brake element 131 to engage at its inner and outer ends the cooperating faces 132 and 133 of the parts heretofore mentioned, to bring about a predetermined operation. The operation of the piston 140 and its control will be hereinafter more fully described in connection with Figs. 8, 9 and 10. The inner face of the annular piston 140 is sealed at its outer end by the O-ring 154 which is positioned in a groove formed in the annular framing element 155, the latter having a lateral flange 156 which is secured by bolts 157 to the frame section 158 as clearly shown. This annular framing element 158 has its outer portion flanged inwardly as at 159 and is grooved internally and inwardly of its ends at 160 to receive a stop ring 170 to position the outer race 171 of a bearing assembly, including the balls 172 and the inner race 173, the latter being mounted on the fixed clutch element 126 as shown and being retained thereon by the inner shoulder 174 and the inner end portion 175 of the gear 176, which latter is fixed on the outer end portion of the fixed clutch element 126 by the key structure 177 and is driven thereby to operate an accessory, such as a fuel pump, through a suitable worm gear 178. The drive flange 180 is splined on the end of the stub shaft 100 by splines 181 and the hub 182 of this coupling element 180 supports the packing assembly 183 to seal the structure against fluid loss. The drive flange or coupling element 180 is locked against outward displacement by the stop ring 190 which is threaded on the end of the stub shaft 100 by threads 191 and locked in adjusted position by the locking nut 192 having the usual lock pin 193. It will be noted that the partition element 134 is drilled and provided with by-passes 184 which permit the fluid to pass through the ports 185 from the oil chamber 186. The partition structure is pinned in between a flange of the outer casing element 158 and the adjacent end wall portion 187 of the main casing by pins 188. Suitable seals 189 are provided for preventing leakage between the casing sections.

To more readily understand the clutch mechanism reference will first be had to Figs 6 and 7 of the drawings. In Fig. 7 the disclosure is diagrammatic and in this disclosure the sliding clutch and brake element is indicated by reference character 131 with the inner teeth 135 and the outer teeth 136. The sliding clutch and brake element 131 is actuated from a piston 140 which shifts the rod 161 to swing the lever 162 on its pivot 163 against the tension of the spaced springs 145 to urge the clutch and brake element 131 to the right or left to secure the necessary operation. The operating cylinder 140 is supplied normally with pressure from the main hydraulic system amounting to approximately 130 p. s. i. through inlet pipe 164, this pipe opening into one side of the cylinder and a branch pipe 165 carrying the same fluid pressure opens into the valve chamber 166 where the valve 167 is provided to control pressure to the opposite side of the piston 140 through the pipe 168, the operation of valve 167 being by means of an electric motor in which the armature 169 is subject to energized coils K or L by operation of the switch arms M which supply the necessary current from the current source N as indicated. In Fig. 6 there is an enlarged view representing the detailed structure of the overrunning clutch which is used and illustrated in Fig. 4, this Fig. 6 showing in detail the arrangement and structure of the springs 145 and the association of these springs with respect to the inner raceway 144 of the bearing assembly, which includes the balls 143 and the outer race 142. The teeth 135 and 136 are illustrated together with the association of the coacting faces 133 and 132. The disclosure of Fig. 6 in association with the diagrammatic view of Fig. 7 will generally explain the actuation of the clutch and its actuating motor and the associated fluid operating mechanism, the latter being shown more fully in Figs. 8, 9 and 10.

In Figs. 8, 9 and 10 the control of the auxiliary speed reducing unit by means of the electrically actuated valve is illustrated. Diagrammatically in these figures the source of electric current is illustrated to include the battery N and the switch M, the movement of the switch to the contacts M$^a$ and M$^b$ controlling the current to the coils K and L to operate a solenoid which shifts the valve 167 to supply high pressure oil when required to move the sliding piston 140 to operate the clutch and brake member 131 which engages the teeth 132 or 133 heretofore described (see Fig. 6). In Fig. 8 the valve 167 is shown in a position to supply high pressure oil to shift the piston 140 to the left to engage the teeth 133, while in Fig. 9 the valve has been moved by the solenoid to supply fluid to the piston 140 so that the sliding clutch and brake element 131 will move to engage the teeth 132. The travel of the high pressure oil, the drain oil, and the lubricating oil is illustrated in Figs. 8 and 9 in accordance with the chart furnished with these figures.

In Fig. 10 there is a longitudinal section shown in which the coils K and L are illustrated, the coil K actuating the solenoid $k$ and the coil L actuating the solenoid $l$ to shift the valve 167 to properly register with the control ports P in the cylindrical valve chamber Q, to provide fluid through the passage 164 in the casing wall, which passage furnishes the fluid to the annular piston 140 for actuation of the clutch element 131.

The unit transmission will be operated in accordance with the operation described heretofore, this operation being illustrated in Fig. 5 for the purpose of presenting a complete understanding of the present development. The controlling system essentially includes an accumulator in the form of an expansible chamber, the accumulator being in communication with the pump PP and auxiliary pump P$^a$, the latter as is conventional being used during engine starting. The oil pressure line between the pump PP and accumulator is provided with a by-pass O which leads to the lubricating system to supply oil as may be required. The controlling mechanism is in the form of a spool valve generally indicated by reference character 90$^a$, this valve being operated as shown by a motor which rotates the valve parts to bring the necessary ports into communication with desired passageways to accomplish the different functions. This structure is conventional, as shown in Fig. 5, and forms no part of the instant invention.

Thus it will be seen that with the motor running at any necessary speed and with driving conditions requiring that the unit transmission be modified, the auxiliary speed reducing transmission control is shifted either up or down as required. The clutch (Fig. 6) between the unit transmission and the auxiliary speed reducing transmission is of the overrunning type and incapable of proper meshing except at synchronized speeds. The shafts of the unit transmission and the auxiliary speed reducing transmission are synchronized automatically and without varying the motor speed. The shaft of the unit transmission is stepped downwardly by shifting the unit transmission control gradually, step by step, until the speed of this transmission shaft will have reached the approximate speed of the auxiliary speed reducing unit. By approximate speed is meant that the speed shall have been reduced in the main transmission unit to at least the speed of the auxiliary speed reducing unit shaft, at which time the clutch faces engage and from this point any lag in the unit transmission shaft is prevented by this clutch engagement, as the auxiliary shaft will carry the main shaft. When you slow down the speed of the unit transmission output shaft, you are actually coasting. The movable part of the clutch will overrun the clutch of the driven shaft until the speeds are in synchronization. In that moment the clutch teeth will lay-on at the high side. The driver may, after the clutches are synchronized, accelerate the engine and in so doing the engine and the drive member of the driven shaft will move in a positive direction and this will result in a torque reverse in the clutch which at this time will snap into full engagement with the gear teeth of the jaw clutch. From this point you select your main gear ratio and any speed on the unit transmission.

In the first phase of the shift from the low to the high range, the output shaft of the auxiliary transmission is reduced to a speed that is one-fourth the speed of the unit transmission output shaft. This phase in the shift is to slow down the speed of the sun gear in the auxiliary transmission planetary and in so doing the ring gear of the same assembly will increase in speed and finally reach the speed of the auxiliary transmission output shaft, and the clutch will automatically engage.

It will be observed that during this operation the output shaft is being driven not by the motor but by the vehicle due to its overrunning as the power plant is disconnected. During the operation synchronizing means between the main unit transmission and the auxiliary transmission, in which the overrunning of the vehicle begins at the time the power is disconnected, is utilized in synchronizing the transmission shafts. In shifting from high range to low range, the operation is exactly reversed and the operation is identical. When shifting from the low range to the high range, it will be necessary to decrease the speed of the unit transmission output shaft in order to increase the speed of the ring gear until it reaches the same speed. In order to accomplish this the unit transmission will be shifted to a lower speed.

What I claim is:

1. A transmission comprising, a casing, an input member connected to a multiple clutch housing, a plurality of drive shafts connectable to said clutch housing, a plurality of series connected brake controlled planetary gear sets and an auxiliary speed reducing unit, two of said drive shafts being connected to two elements of the first of said brake-controlled gear sets, a third of said drive shafts being connected to an element of the last of said gear sets, said auxiliary speed reducing unit including a sun gear connected to an output shaft from said last of said gear sets, planet pinions in mesh with the sun gear and rotatably mounted on a carrier connected to a driven shaft, an orbit gear in mesh with said planet pinions and means for selectively locking said orbit gear to the transmission casing or to the driven shaft including a shiftable member slidably moved on the orbit gear by a fluid actuated annular piston, said shiftable member having an overrunning connection with the transmission casing or the driven shaft.

2. The structure of claim 1 characterized in that the orbit gear of the auxiliary speed reducing unit includes a hub extension mounted on the driven shaft and the shiftable overrunning connecting means is splined on said hub.

3. The structure of claim 1 characterized in that the overrunning connecting means between the transmission casing and the driven shaft is of annular form and the annular piston actuates the same through resilient connections.

4. The structure of claim 1 characterized in that the overrunning connecting means is of annular form and is concentrically arranged with respect to the annular piston.

5. The structure of claim 1 characterized in that the orbit gear of the auxiliary speed reducing unit includes a hub extension mounted on the driven shaft, and the overrunning connecting means and annular piston are arranged concentrically about the hub.

6. The structure of claim 1 characterized in that the overrunning connecting means between the orbit gear of the speed reducing unit and the casing includes an annular clutch collar splined on a hub extension of the orbit gear, and the annular piston is concentrically arranged thereabout and in spaced relation thereto, an anti-friction bearing assembly being interposed between the piston and collar and movable with the piston to transmit movement of the piston to the collar.

7. The structure of claim 1 characterized in that the casing is formed with an annular partition having clutch parts for association with the overrunning connection for locking the orbit gear of the speed reducing unit to the casing.

8. The substance of claim 1 characterized in that the annular piston is arranged in the casing and concentrically encloses the slidable and shiftable member having the overrunning connection with either the casing or driven shaft, a ball bearing assembly being interposed between the annular piston and slidable and shiftable member, the outer race of the bearing assembly being fixed in the inner wall of the piston and the inner race being slidably associated with the slidable and shiftable member, and cushioning elements interposed between the lateral faces of the inner race and adjacent faces of the slidable and shiftable member to resiliently impart thrust to the latter in either direction upon movement of the piston.

CARL EINAR SCHOU.

References Cited in the file of this patent

UNITED STATES PATENTS

| Number | Name | Date |
| --- | --- | --- |
| 252,537 | Stewart | Jan. 17, 1882 |
| 1,193,916 | Norris | Aug. 8, 1916 |
| 2,044,660 | Alden | June 16, 1936 |
| 2,084,522 | Cotal | June 22, 1937 |
| 2,130,632 | Pollard | Sept. 20, 1938 |
| 2,144,270 | Palmgren | Jan. 17, 1939 |
| 2,167,873 | Burtnett | Aug. 1, 1939 |
| 2,185,538 | Burtnett | Jan. 2, 1940 |
| 2,198,072 | Banker | Apr. 23, 1940 |
| 2,259,437 | Dean | Oct. 21, 1941 |
| 2,272,934 | Cotal | Feb. 10, 1942 |
| 2,292,633 | Griswold | Aug. 11, 1942 |
| 2,326,994 | Duffield | Aug. 17, 1943 |
| 2,351,746 | Dreihaus | June 20, 1944 |
| 2,397,883 | Petersen et al. | Apr. 2, 1946 |
| 2,408,008 | Tipton | Sept. 24, 1946 |
| 2,466,320 | Lawrence | Apr. 5, 1949 |

FOREIGN PATENTS

| Number | Country | Date |
| --- | --- | --- |
| 414,157 | Germany | May 25, 1925 |
| 428,779 | Great Britain | May 13, 1935 |